United States Patent [19]
Bauer

[11] Patent Number: 5,207,117
[45] Date of Patent: May 4, 1993

[54] SLIDING REGULATOR WITH LAMELLAE SEALING MEANS

[75] Inventor: Karl-Heinz Bauer, Bad Neustadt/Saale, Fed. Rep. of Germany

[73] Assignee: Preh-Werke GmbH & Co. KG, Fed. Rep. of Germany

[21] Appl. No.: 767,062

[22] Filed: Sep. 27, 1991

[30] Foreign Application Priority Data

Sep. 29, 1990 [DE] Fed. Rep. of Germany ....... 4030909

[51] Int. Cl.⁵ .................. G05G 29/04; G05G 1/02; F24F 13/12
[52] U.S. Cl. .................... 74/566; 277/237 R; 277/53; 277/DIG. 4
[58] Field of Search ............ 74/566; 277/12, 53, 277/237 R, 174, 277, DIG. 4; 292/147, 152

[56] References Cited

U.S. PATENT DOCUMENTS

| | | | |
|---|---|---|---|
| 3,082,642 | 3/1963 | Hammerand | 74/543 X |
| 3,748,923 | 7/1973 | Babbitt, Jr. et al. | 74/566 |
| 4,027,361 | 6/1977 | Yonega | 74/566 X |
| 4,029,324 | 6/1977 | Berkes | 74/566 X |
| 4,376,543 | 3/1983 | Sakagami | 277/12 X |
| 4,526,509 | 7/1985 | Gay, Jr. et al. | 277/53 X |
| 4,900,040 | 2/1990 | Miller | 277/30 |
| 4,918,846 | 4/1990 | Tsukada | 277/181 X |
| 4,953,424 | 9/1990 | Lazzari | 74/566 |
| 5,085,444 | 2/1992 | Murakami et al. | 277/152 X |

FOREIGN PATENT DOCUMENTS

| | | | |
|---|---|---|---|
| 1144204 | 4/1983 | Canada | 277/DIG. 4 |
| 2807819 | 8/1979 | Fed. Rep. of Germany | 74/566 |
| 8708331.0 | 9/1987 | Fed. Rep. of Germany | |

Primary Examiner—Leslie A. Braun
Assistant Examiner—Khoi Q. Ta
Attorney, Agent, or Firm—Woodcock Washburn Kurtz Mackiewicz & Norris

[57] ABSTRACT

The invention relates to a sliding regulator, having a sliding slot which is closed without leaks against dust, etc., even in the immediate surrounding of the sliding member. According to the invention, this is achieved by a rubbery-elastic sealing lip associated with the sliding slot, which consists of a string of aligned lamellae attached to each other so as to form a flexible barrier against penetration of unwanted matter. The lamellae barrier deforms as the sliding member slides through it, so that the interface between the two remains substantially constantly sealed.

11 Claims, 4 Drawing Sheets

SLIDING REGULATOR WITH LAMELLAE SEALING MEANS

BACKGROUND OF THE INVENTION

1. Field of the Invention

The present invention relates to the sliding regulator of an operating unit, comprising a sliding slot with a rubbery-elastic sealing lip to prevent penetration of unwanted matter, e.g. dust, light or moisture. The sealing lip is arranged on the inside of the sliding regulator with respect to the operator remote side. A regulating member projects through the sliding slot and is movable along said slot.

2. Description of the Prior Art

Sliding regulators of this type include rotary regulators, as well as a number of alternative regulating means, and are widely used and known in engineering. Sliding regulators can be found, for example, in consumer electronics devices, in electric household appliances, and measuring devices and light dimmers. In most of these cases, sliding regulators are used to manually influence electrical values. In ventilation or air conditioning systems of motor vehicles, actuation of a sliding regulator opens or closes an element such as an air flap; additionally, if required, Bowden cables may be actuated.

According to the application or environment of the sliding regulator, it is generally useful to close the usually open sliding slot by a sealing means, so that the interior of the sliding regulator is protected against contaminants from the exterior, like dust and splash water etc., or to avoid penetration of light. In practice, sealing means of this kind can often be found in the form of screens or ribbon-type blinds, which move together with the regulating member. There are also sealing means covering the sliding slot of a sliding regulator, which are fixed, with the regulating members of the sliding regulator sliding along the sealing means and partially displacing it. An embodiment with a sealing means of this kind is disclosed in DE-U 87 08 331. In this embodiment, two rubber-elastic, fixed sealing lips, the sealing edges of which are directed against each other, overlap in the central area of the sliding slot. Upon actuation the regulating member slides along the sealing edges and partially opens the overlap.

The sealing means known in connection with sliding regulators have their respective specific advantages and disadvantages, e.g., with regard to cost of materials, expense for installing, required space, tightness etc., which will not be discussed here in great detail. However, in connection with stationary sealing means, it is noted that a brush-type embodiment is expensive to produce and at times light permeable, which is considered to be disadvantageous with internally arranged light sources. Similarly, a foil-type embodiment, due to its stretched position and/or rigidity, does not sit form-fit at the front faces of the sliding regulator in the moving direction, and allows formation of greater leaks.

SUMMARY OF THE INVENTION

It is an object of this invention to provide a sliding regulator of the general type described above, which is provided at the sliding slot with an easy-to-handle sealing means, made of one integral piece. The sealing means covers not only the sliding slot, but also specifically the interface surrounding the regulating member, so that it becomes dust- and light-proof. According to the invention, this object is solved by providing that the one piece sealing lip consists of a string of lamellae, which are spaced against one another and arranged at right angles to the longitudinal axis of the sliding slot, and further that the adjacent lamellae of the sealing lip are connected in a bridge-type manner by a wall, which closes the gap in the direction of penetration normal to the sliding slot. The lamellae are made thicker than the walls, the walls having a requisite flexibility to permit movement of the lamellae relative to each other while maintaining an effective seal.

The sealing means of the sliding regulator consists of lamellae and joining walls. By appropriate selection of their cross-section, the lamellae, which are made of rubbery-elastic material and serve to seal the sliding slot, are comparatively rigid, and, with sufficient mounting, possess corresponding positional stability. If the lamellae are deformed mechanically, e.g., by the regulating member sliding along, they strive to regain their original position by themselves. At every moment, only those lamellae which are displaced by the regulating member are deformed. The lamellae adjacent to the regulating member are in their normal position, and embed the regulating member so as to advantageously prevent at its front faces leaks in the direction of penetration of the regulating member. The lamellae are spaced so that when they are deformed by the regulating member, no significant accumulation of wall material can be produced in a manner which tends to jam. Adjacent lamellae are connected by means of a wall in a bridge-type manner.

The wall is intended to close the space between adjacent lamellae in the direction of penetration of the regulating member. The wall is relatively thin, so as to give this portion of the sealing lip as much elasticity as possible. The flexible wall follows the relatively rigid lamellae into their deformation position without developing substantial forces; at the same time it adapts in an advantageous form-fit manner to the regulating member, so that no leaks are created. The wall represents the essential sealing member of the sealing lip; it is carried and guided by the lamellae. The sealing lip embraces the regulating member by the advantageous combined action of lamellae and walls at three sides; the fourth side of the regulating member sits close to the sliding slot. A sealing lip of this kind seals the sliding slot of the sliding regulator against dust etc. in a simple way, and particularly in the immediate surrounding area of the regulating member.

In the sliding regulator the sealing lip can be secured form-fit directly to e.g. the edge of the slot. For fastening so that the sealing lip as a whole is fixed relative to the slot, an additional segment can be integrated to the sealing lip, which segment includes, if required, a hole or a groove. In one embodiment of the invention, a fastening segment of this kind is represented by an incorporated longitudinal rail, where the ends of the lamellae form the front face of one side of the rail. Thus the longitudinal rail additionally stabilizes the arrangement of the lamellae by reinforcing the sealing lip on one side. The opposite side, which stays elastic, is operatively associated with the regulating member.

The lamellae of the sealing lip can be arranged in an angular position with respect to the longitudinal direction of the sliding slot, or, if required, in an inclined position. A vertical, parallel arrangement of the lamellae according to the proposed embodiments is preferable in view of the to-and-fro movement of the regulating member.

In a particularly preferable embodiment of the invention, the wall is integrated at the interval edge of the lamellae, at the remote end from the sliding slot. A wall which is shaped in this way will bend to the outside if the lamellae are deformed by the regulating member, especially if it is preformed with a corresponding fold. The wall does not fold between the lamellae and thus helps to minimize material accumulation around the regulating member, so that the distance of the lamellae can be decreased and the number of lamellae increased.

In another embodiment of the sliding regulator, e.g. in a vertical operating arrangement for air condition adjustment in a motor vehicle, it is proposed to produce a sealing lip from silicone with a hardness of about 50 shore, which gives the operator a feeling of sliding adjustability. Further embodiments of the sliding regulator, wherein the lamellae of the sealing lip are twice as thick as the associated wall or where the sides of the sliding member lying in the moving direction are angularly shaped, show a similar positive effect.

BRIEF DESCRIPTION OF THE DRAWINGS

The preferred embodiments of the invention are described below and illustrated with reference to the drawings, in which.

DESCRIPTION OF THE PREFERRED EMBODIMENTS

Figure 1:
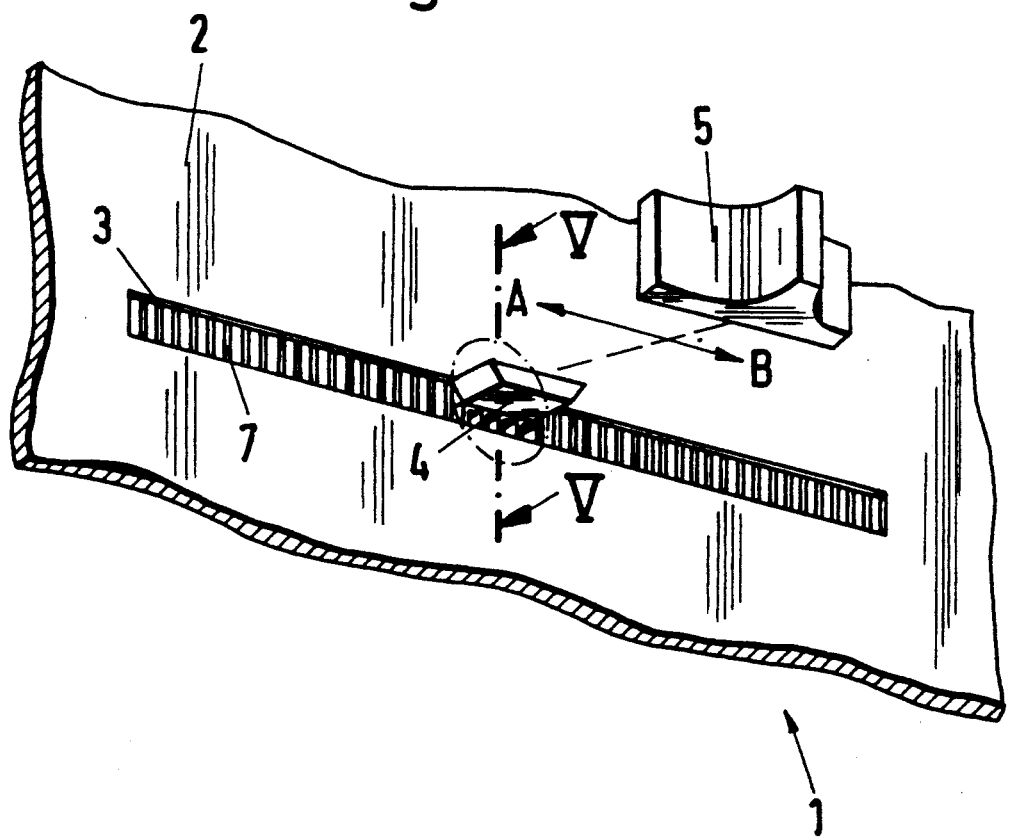
FIG. 1 shows a perspective outside view of a sliding regulator in relation to a section of an operating unit.
Figure 2:
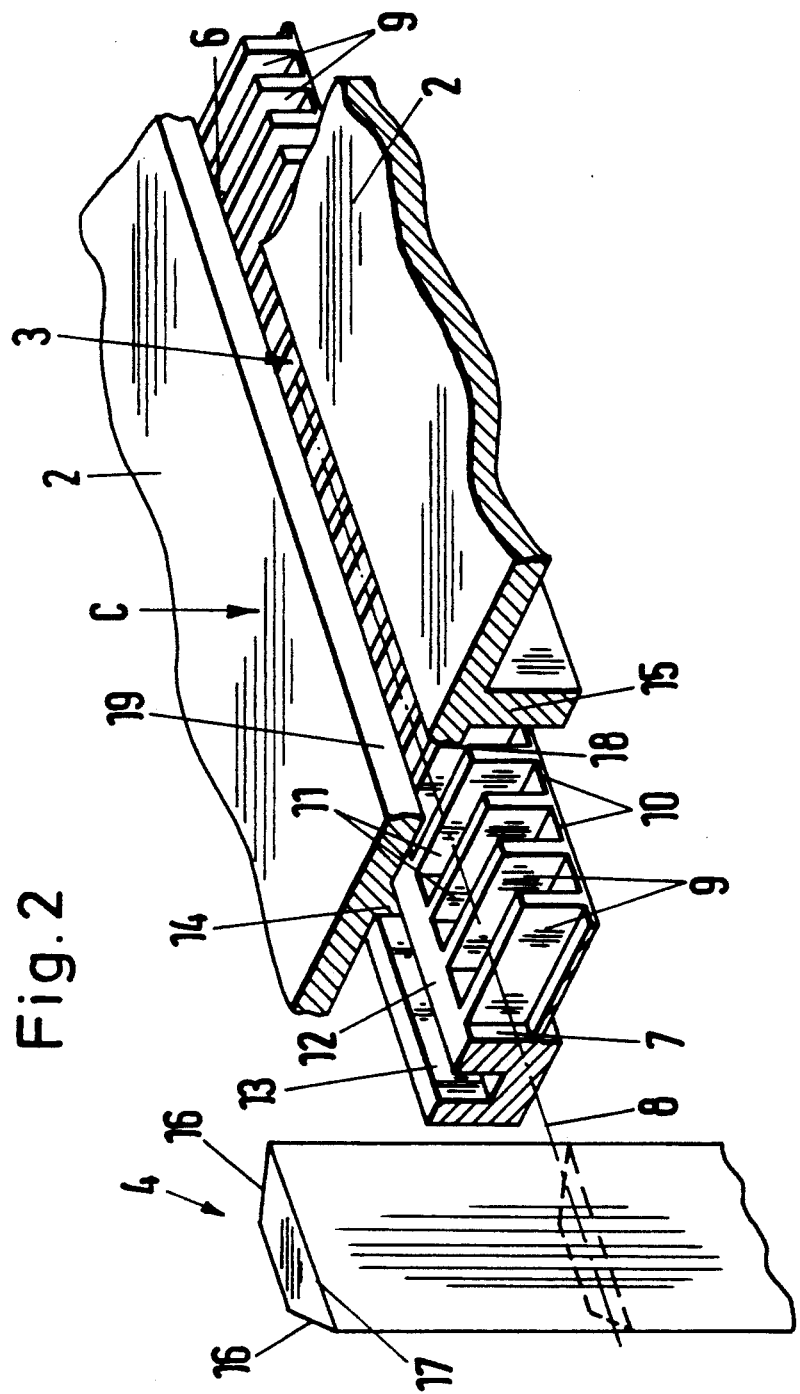
FIG. 2 shows a detailed view of a sliding slot on an enlarged scale.

FIG. 1 shows a perspective outside view of a sliding regulator 1. A section of the front panel 2 is illustrated as a portion of a larger operating unit. A sliding slot 3 is incorporated in the front panel 2, through the opening of which a regulating member 4 of the sliding regulator projects. The regulating member 4 can be moved in regulating direction A, B along the sliding slot 3. In order to facilitate handling of the regulating operation, a regulating knob 5 is attached to the regulating member 4. As also seen in FIG. 2, a sealing lip 7 on the internal side 6 of the sliding slot 3 prevents penetration of dust, light, etc. through the sliding slot 3 into the interior of the device, and vice versa. In terms of the operation of the sliding regulator, it is irrelevant which unit in the interior of the device communicates with the regulating member, or which mechanical or physical values are to be influenced by its actuation.

In operation, the regulating member 4 is slid along slot 3 and through the sealing lip 7. The member 4 effectively displaces the lip as it moves, so that it is substantially continuously in form-fit engagement with the lip. In other words, the flexible sealing lip continually conforms to the surface of the member, so that there is no substantial opening or crack at the interface between the lip and the member.

In FIG. 2 an enlarged section of the sliding regulator shows details with regard to the formation and association of sliding slot 3, sealing lip 7 and regulating member 4. The sliding slot 3 of the front panel 2 is associated at its internal side 6 with a sealing lip 7, which provides a sealing means. The longitudinal direction of the sliding slot 3 is indicated by the longitudinal axis 8. The sealing lip 7 contains a string of lamellae 9. The lamellae are normally rigid, but possess enough flexibility to flex in response to the movement of member 4; they return to their normal relatively rigid position after passage of the member. The lamellae are preferably made of silicone or an equivalent rubbery material. The lamellae 9 are connected by wall segments 10, which are formed in a bridge-type manner, and may be made of the same type of rubbery material. The spaced lamellae 9 are located parallel to one another in planes which are perpendicular with respect to the longitudinal axis 8. Lamellae which are arranged angularly with respect to the longitudinal axis are within the scope of the invention, although the perpendicular lamellae are preferred. The wall 10 closes the gaps 11 of the lamellae 9 in the direction of penetration C. On the whole, the walls 10 are shown in FIG. 2 in parallel arrangement with respect to the front panel 2. However, they could, without disadvantage for their closing action, also be arranged inclined with respect to the front panel or be spaced differently. A rail 12 is added on one side to the lamellae 9 and the walls 10. The rail 12 comprises a longitudinal groove 13, which interacts with a first web 14 of front panel 2. This interaction keeps the sealing lip 7 in a fixed parallel arrangement with respect to the longitudinal axis 8. The space at the internal side 6 of the sliding slot 3 is limited by a second web 15 of the front panel 2. That end of the regulating member 4 which is turned towards the regulating knob 5 is visible. The regulating member 4 is movable in the sliding slot along the longitudinal axis 8. The regulating member has a trapezoidal cross section due to its angular front faces 16 The regulating member 4 is located within the sliding slot 3 (see FIG. 5), and sits form-fit with its larger longitudinal side 17 adjacent to the edge 18 of the front panel 2, which edge 18 is opposite to the rail 12; normally, the regulating member is spaced with respect to the opposite edge 19. With respect to the cross-section of the sliding slot 3, the regulating member 4 is not centered, as is shown in FIG. 1; in other words, the regulating member 4 is situated in the region where the lamellae are movable.

Figure 3:
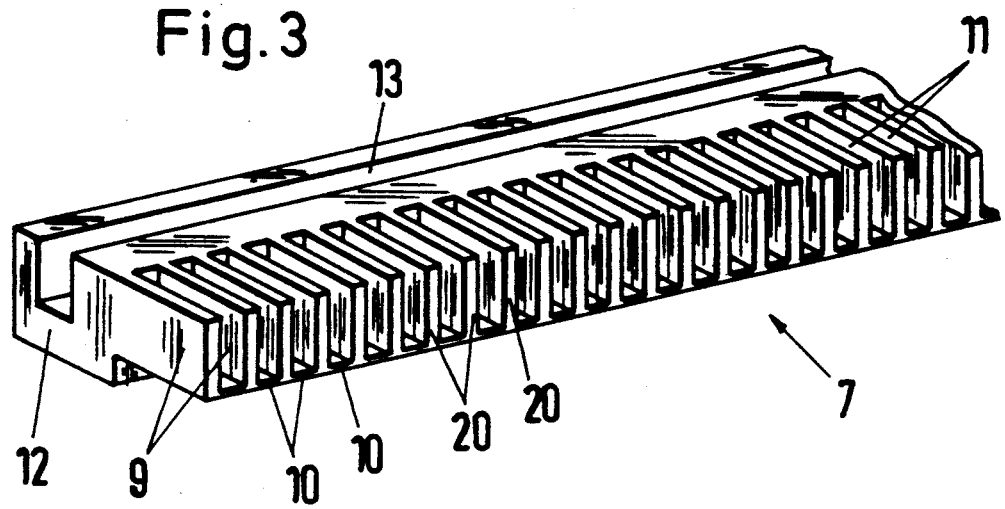
FIG. 3 shows a sealing lip as a single component.
Figure 4:
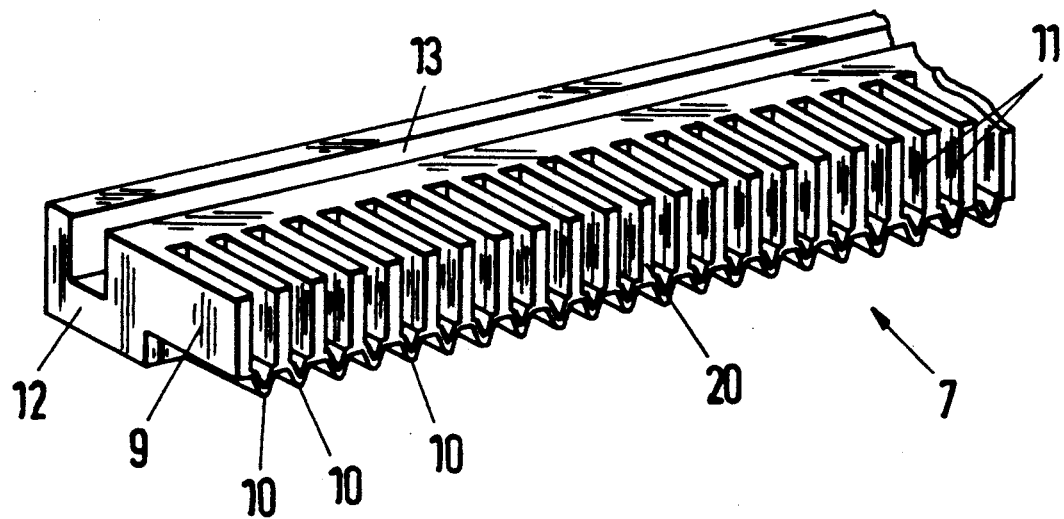
FIG. 4 shows an alternate embodiment of a single component sealing lip.
Figure 5:
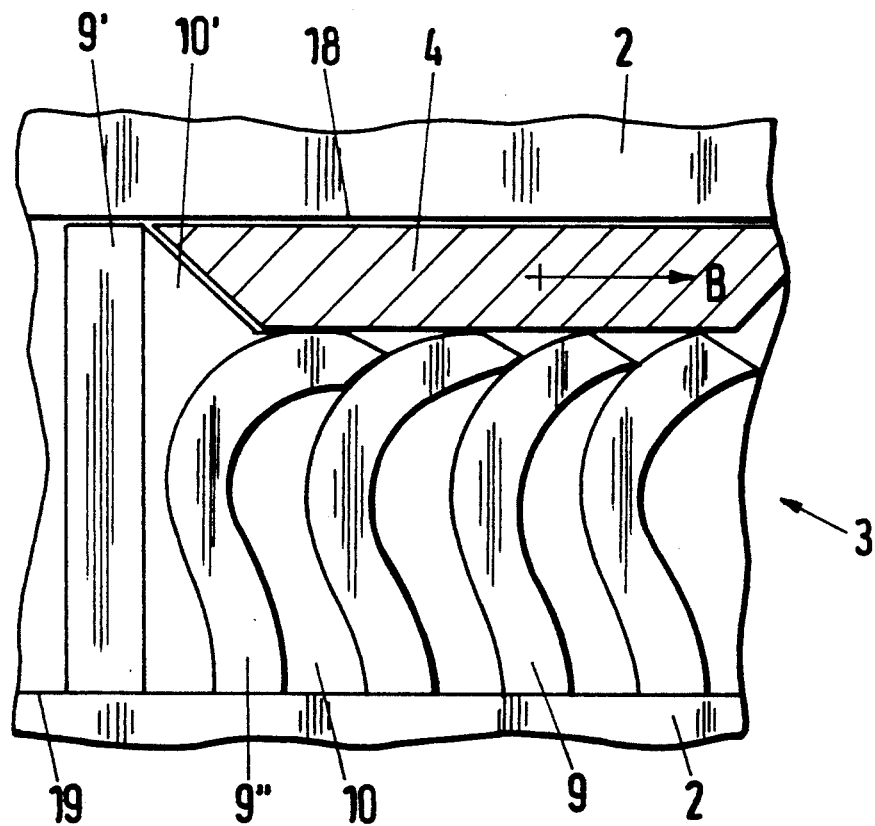
FIG. 5 shows an enlarged section from FIG. 1 (V—V) illustrating the sealing lip and regulating member of this invention.

FIG. 3 and FIG. 4 show the end portions of alternative sealing lips 7. The wall 10 in FIG. 3 is planar; in FIG. 4 the wall has a folded form. The walls 10 are attached at the opposite edge 20 of the lamellae, which is remote of the slot; the wall 10 does not hamper the lamellae 9 from flexing toward each other, and does not bulge into the gap 11. The lamellae 9 are preferably about three times thicker than wall 10. FIG. 5 shows, in a greatly enlarged section, the behavior of lamellae 9 and walls 10 in connection with the trapezoidal regulating member 4. It can be seen that the regulating member 4 is embedded form-fit by the elements 9, 10 of the sealing lip 7. The lamellae 9 which are level with regulating member 4 are deformed and sit close to one another. When the lamellae 9 sit close, the walls 10 do not lie between them in any detrimental manner. As seen in this figure, the regulating member had previously been moved in regulating direction B, as can be seen from the position of the lamellae 9. The lamellae 9' adjacent to regulating member 4 has, due to its relative rigidity, already returned to its normal, unstressed position since the regulating member has slid past it. The adjacent elastic wall 10' follows on the one hand the unstressed lamellae 9' and on the other hand the deformed lamellae 9". At the same time the wall 10' embraces the outline of the regulating member 4 at its front face 16, with the result that no leaks in direction of penetration C are created.

With a vertical front panel 2 with horizontally positioned sliding slot 3, it is of advantage with respect to the action of sealing lip 7, to arrange edge 18, which is in coaction with longitudinal side 17 of the regulating member 4, in the upper position, while the opposite edge is in the lower position.

I claim:

1. A sliding regulator in combination with an operating unit, comprising a sliding slot in said unit, and having mounted within said slot a rubbery-elastic sealing lip for preventing penetration of unwanted matter, and further comprising a regulating member projecting through the sliding slot and the lip, and being movable along said slot, characterized in that said sealing lip is a one piece element and consists of a string of lamellae which are normally spaced apart from one another by gaps and are arranged substantially at right angles to the longitudinal axis of said sliding slot, adjacent lamellae of said sealing lip being connected in a bridge-type manner by a wall which closes said gaps to prevent penetration of said unwanted matter through said sliding slot, and wherein said lamellae are thicker than said walls.

2. The sliding regulator as claimed in claim 1, further characterized in that a common rail is formed to one side of the lamellae and walls, said rail running laterally with respect to said sliding slot and aligning with it.

3. The sliding regulator as claimed in claims 1 or 2, further characterized in said lamellae are aligned as rectangles transverse to said longitudinal axis.

4. The sliding regulator as claimed in claim 1, wherein said lamellae are normally in parallel position to one another.

5. The sliding regulator as claimed in claim 1, characterized in that said wall is integrated at one end of said lamellae.

6. The sliding regulator as claimed in claim 1, wherein said wall is a bellow-type wall.

7. The sliding regulator as claimed in claim 1, wherein the ratio of the thickness of said lamellae to said wall is at least 2:1.

8. The sliding regulator as claimed in claim 1, wherein said sealing lip is made of silicone with a hardness of approximately 50 shore.

9. The sliding regulator as claimed in claim 1, wherein said regulating member has angled faces with interact with said lamellae when said regulating member is moved through said slot.

10. The sliding regulator as claimed in claim 1, wherein both said lamellae and wall are composed of silicone.

11. A sliding regulator in combination with a unit housed within a panel, comprising
   a slot in said panel;
   a regulating member projecting through and slidable along said slot, said member engaging said unit within said panel and having a knob outside of said panel for manipulation; and
   sealing means positioned inside of said panel for sealing said slot along the length thereof while permitting said member to slide to any position along said slot, said sealing means having rubbery lamellae which extend substantially transverse to said slot and spaced apart by gaps, and wall material carried by said lamellae which substantially connect across said gaps and extending substantially parallel to the plane of said panel, said lamellae and said wall material having a flexibility so that said member can slide past them and so that they provide a form-fit within said member at any position it takes along said slot.

* * * * *